UNITED STATES PATENT OFFICE.

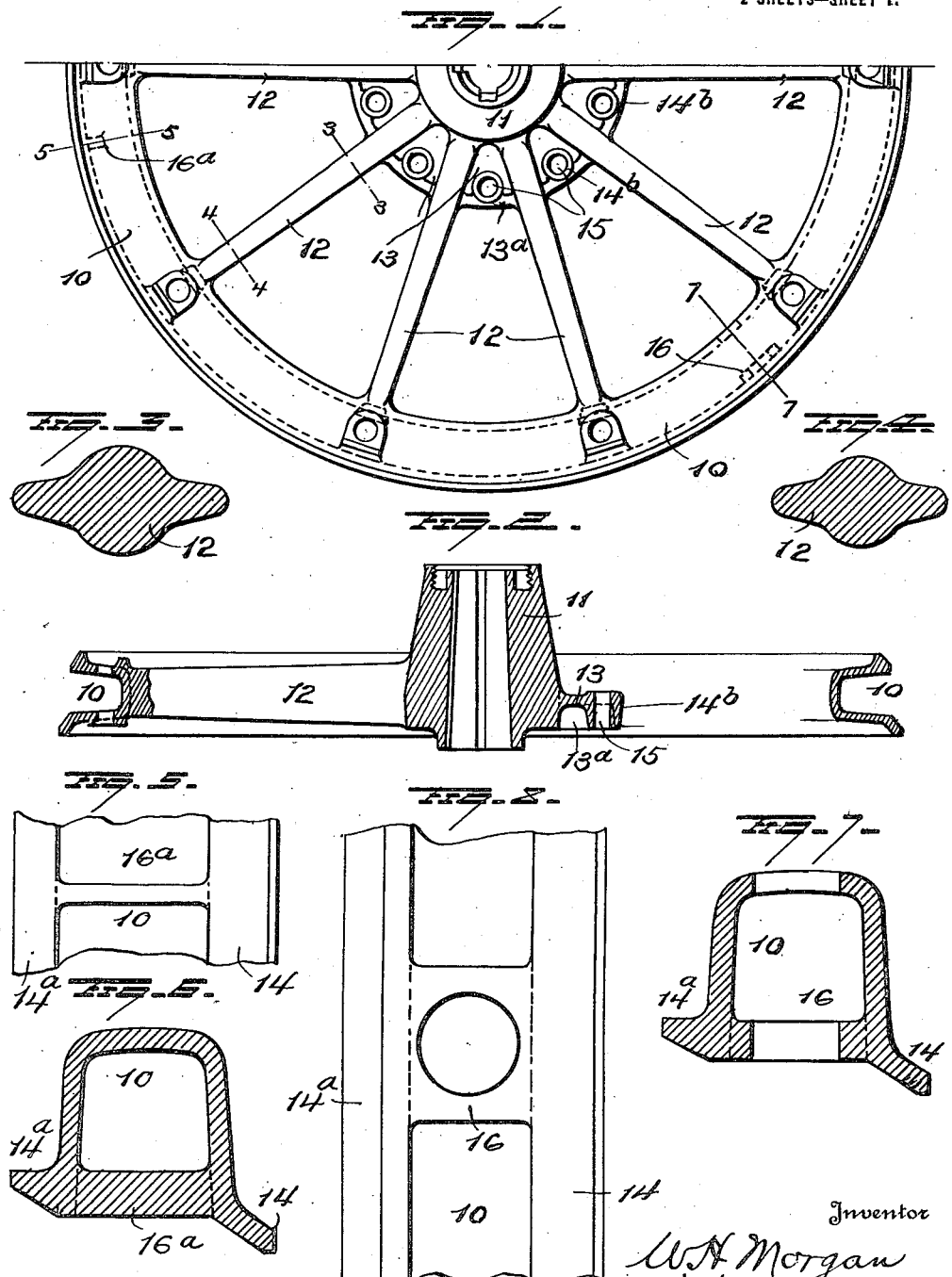

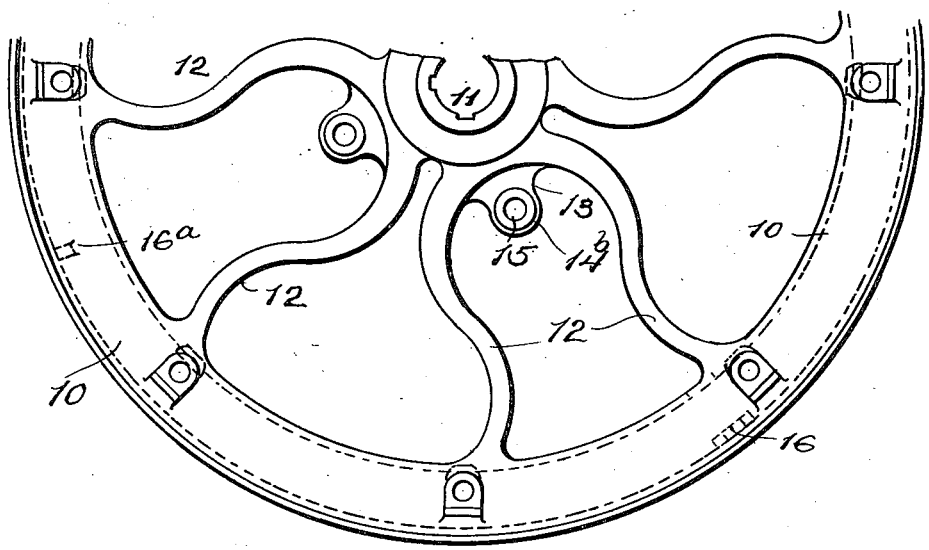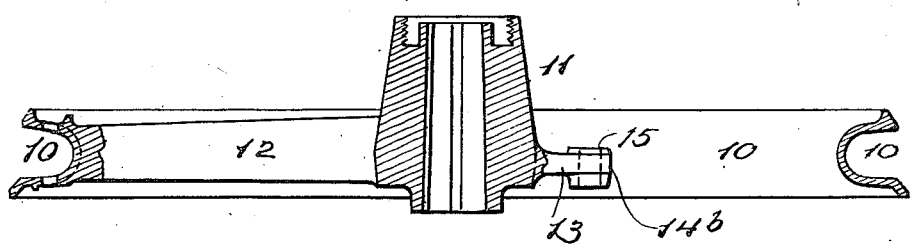

WILLIAM HENRY MORGAN, OF ALLIANCE, OHIO.

CAST METAL WHEEL.

1,414,663. Specification of Letters Patent. Patented May 2, 1922.

Application filed June 29, 1921. Serial No. 481,279.

*To all whom it may concern:*

Be it known that I, WILLIAM H. MORGAN, a citizen of the United States, and a resident of Alliance, in the county of Stark and State of Ohio, have invented certain new and useful Improvements in Cast Metal Wheels; and I do hereby declare the following to be a full, clear, and exact description of the invention, such as will enable others skilled in the art to which it appertains to make and use the same.

My invention relates to an improvement in cast metal wheels designed particularly for self propelled vehicles, and it consists in a wheel the hub, spokes and felly of which are cast integral, the spokes and felly being shaped to provide for the greatest possible strength sidewise so as to prevent the wheel from collapsing from side pressure due to any cause, such as centrifugal force in going around curves, skidding or being sideswiped or side-ditched, all of which throw most of the weight of the car sidewise on the wheels.

It further consists in a cast metal wheel having spokes so shaped as to act as fan blades to assist in cooling the brake drum and brake band. It further consists in a U-shape felly cast integral with the spokes, the felly being reinforced at its free side edges. It further consists in certain details of construction as will be more fully explained and pointed out in the claims.

In the accompanying drawings, Figure 1 is a view in elevation of a wheel embodying my invention, part of it being broken away; Figure 2 is a view in section of the same; Figure 3 is a view in section of the spokes on the line 3—3 of Figure 1; Figure 4 is a view through a spoke on the line 4—4 of Figure 1; Figure 5 is a view in plan of a part of the felly; Figure 6 is a view in section of the felly on the line 6—6 of Figure 1 and showing the rib shown in Figure 5; Figure 7 is a view in cross section of the felly taken on the line 7—7 of Figure 1; Figure 8 is a view in elevation of a section of the felly showing the valve stem holding lug shown in Figure 7 and Figures 9 and 10 are views similar to Figures 1 and 2 of a modified form of wheel.

The wheel comprises a felly 10, hub 11 and spokes 12 all cast integral. The hubs for the rear wheels are constructed to be keyed to the rear or driving axle and are provided with means for the attachment of the brake drums, to be hereinafter referred to, wherein the front wheels are mounted to rotate on the stub or steering axles, and are of course minus brake drums. In other respects they are identical with the rear wheels, hence the description of the rear wheels which are shown, except as to the points above referred to, applies also to the front wheels.

The spokes 12 are of a modified elliptical shape in cross section as shown in Figures 3 and 4, with their long diameters extending transversely of the wheels, thus distributing the metal so as to provide for great lateral strength and prevent dishing of the wheel when the machine skids or when subjected to great lateral stresses such as occur when turning a curve, or when the wheels strike a curb, or the machine is side-swiped or side-ditched. They are cast integral with the hub 11 and felly 10 and their long or transverse diameters at their point of juncture with the felly are substantially the width of the latter, and are connected and reinforced adjacent the hub by the integral web 13 which is cast integral with the hub and spokes and is reinforced by a marginal flange 13ª. Spokes so shaped and having wide faces also act as fan blades for cooling the brake drums of the rear wheels, and being of metal assist in dissipating the heat generated in the brake drum and tires. The webs 13 on the rear wheels are provided with the projecting bosses 14 having drilled holes 15 for the passage of the bolts which secure the brake drum to said wheels.

The felly 10, which as above stated is cast integral with the spokes, is U-shape in cross section with its open face at the periphery. It is reinforced at the side edges adjacent the open face thereof by the side flanges or ribs 14 and 14ª, the former of which is inclined upwardly and outwardly forming a continuous stop or abutment for the demountable rim, and the rib 14ª has an inwardly beveled outer face as shown in Figure 6 to permit of the ready attachment and removal of the demountable rim. At the juncture of the spokes with the felly, these parts and particularly the latter are reinforced by the lugs 15 which also form seats for the clips employed in securing the demountable rim in place, the clips being secured by bolts passing through the holes 16 formed in the side walls of the felly. The two peripheral flanges or ribs 14 and 14ª on the felly form the seat for the demountable rim carrying the tire, and the side walls of the felly are connected near their free edges at oppositely disposed points by transverse ribs or lugs 16 and 16ª cast integral with the felly and bridging the space between the side walls. The lug or rib 16 and the rear wall of the felly opposite said lug is drilled to receive the valve stem leading from the inner tube of the tire, while the lug or lugs 16ª prevent the flanges or the demountable rim from getting in between the side walls of the felly, in other words, in putting on and taking off the rim, the rib or ribs 16ª act as guide over which the rim can be slid into position.

In the construction shown in Figures 9 and 10 the spokes 12 are S-shape in side elevation. Spokes of this shape are more resilient than straight spokes and in case the felly shrinks while cooling the spokes will give or yield without breaking.

The advantage of spokes elliptical in shape as shown, with their long diameters transversely of the wheels, in addition to adding lateral strength as above explained, are that there are no recesses or projections to catch and hold dirt; are readily and easily cleaned and owing to the increased space between the spokes due to the flattening of the latter, permit of ready access to the brake band for adjusting and repairing the same.

After the wheels constructed as above described are cast they are thoroughly annealed to remove all cooling strains and change its crystalline structure so that they will yield or give and not readily shatter when subjected to a blow, and after being subjected to heat treatment they may be bored and turned at one setting of the machine thus insuring perfect rotation which cannot be disturbed by changes in temperature.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. As a new article of manufacture, a wheel comprising a hub, spokes and felly all cast integral, the spokes being elongated transversely and the felly U-shaped in cross section with its opening at the periphery and provided with marginal flanges at the sides of the opening which form the seat for a demountable rim.

2. As a new article of manufacture, a wheel comprising a hub, spokes and felly all cast integral, a web cast integral with the hub and spokes and having a marginal reinforcing flange, the felly being U-shaped in cross section with the opening at the tread or periphery thereof and provided with a marginal flange at each side of said opening.

3. As a new article of manufacture, a wheel comprising a hub, spokes and felly all cast integral, the spokes being elongated transversely and the felly U-shape in cross section with the open face at the periphery and provided with marginal flanges, the flanges at the inner side of the open face being inclined outwardly to form a stop for the demountable rim, and the flange at the outer side of the wheel being beveled inwardly.

4. As a new article of manufacture, a wheel comprising a hub, spokes and felly all cast integral, the spokes being elongated transversely and bulged at their centers, and the felly being U-shape in cross section and provided with marginal flanges at the sides of the opening therein.

5. As a new article of manufacture, a wheel comprising a hub, spokes and felly all cast integral, the spokes being elongated transversely, the long diameter of the spokes at their juncture of the felly being approximately the width of the latter and the felly being U-shape with the opening in the outer face thereof, the free edge of the side walls of the felly having outwardly projecting reinforcing flanges which form the seat for the rim of the wheel.

6. As a new article of manufacture, a wheel comprising a hub, spokes and felly, all cast integral, the felly being U-shape in cross section, an integral lug connecting the side walls of the felly and provided with an opening for the air valve tube of the tire.

7. As a new article of manufacture, a wheel comprising a hub, spokes and felly all cast integral, the felly being U-shape in cross section and provided with a drilled opening for the passage of air valve tube of the tire, and also provided with an integral lug connecting the side walls and forming a support for the rim while the latter is being placed on and removed from the wheel.

8. As a new article of manufacture, a wheel comprising a hub, spokes and felly all cast integral, the felly being U-shape in cross section and provided at the free edges of its walls with peripheral flanges which form the seat for the rim, and also provided with openings for the bolts which secure the rim in place, the said openings being located at the juncture of the spokes and the felly.

In testimony whereof, I have signed this specification in the presence of two subscribing witnesses.

WILLIAM HENRY MORGAN.

Witnesses:
N. C. FETTERS,
I. H. ALEXANDER.